US007766539B2

(12) United States Patent
Aoyama et al.

(10) Patent No.: US 7,766,539 B2
(45) Date of Patent: Aug. 3, 2010

(54) APPARATUS FOR MIXING LIQUIDS TO FORM A LINER MATERIAL

(75) Inventors: Naoki Aoyama, Hiratsuka (JP); Junichi Miyo, Hiratsuka (JP); Takuya Oyamada, Hiratsuka (JP); Susumu Hisanaga, Hiratsuka (JP); Katsuhiro Muramoto, Hiratsuka (JP)

(73) Assignee: Japan Crown Cork Co., Ltd., Tokyo (JP)

( * ) Notice: Subject to any disclaimer, the term of this patent is extended or adjusted under 35 U.S.C. 154(b) by 1138 days.

(21) Appl. No.: 11/385,748

(22) Filed: Mar. 22, 2006

(65) Prior Publication Data

US 2006/0215486 A1 Sep. 28, 2006

(30) Foreign Application Priority Data

Mar. 24, 2005 (JP) ............................ 2005-086555

(51) Int. Cl.
*B01F 15/04* (2006.01)
*B01F 15/06* (2006.01)

(52) U.S. Cl. .................. 366/162.1; 366/149; 366/181.5

(58) Field of Classification Search ................. 366/144, 366/145, 146, 149, 160.1–162.1, 181.5
See application file for complete search history.

(56) References Cited

U.S. PATENT DOCUMENTS 1,584,126 A * 5/1926 North ......................... 426/388
3,784,169 A * 1/1974 Bockmann et al. .......... 425/146
4,051,065 A * 9/1977 Venema .................. 366/181.5
7,160,021 B2 * 1/2007 Yamazaki et al. ........... 366/149
7,357,563 B2 * 4/2008 Phallen et al. ........... 366/181.5
2004/0196734 A1 * 10/2004 Mehta et al. ............ 366/181.5
2006/0215486 A1 * 9/2006 Aoyama et al. ............ 366/149

FOREIGN PATENT DOCUMENTS

JP 2003-145019 A 5/2003
WO 2004/076043 A1 * 9/2004

* cited by examiner

*Primary Examiner*—Charles E Cooley
(74) *Attorney, Agent, or Firm*—Sughrue Mion, PLLC

(57) ABSTRACT

A liner material supply apparatus by which the weight ratio between a first feedstock liquid and a second feedstock liquid to be fed to static mixers (40, 42) is maintained sufficiently precisely. A heater for bring the temperature of the first feedstock liquid, which is fed from a first accommodation tank (26) to the static mixers through a first feeding pump (22), and the temperature of the second feedstock liquid, which is fed from a second accommodation tank (28) to the static mixers through a second feeding pump (24), to predetermined temperatures are annexed, at least, to the first feeding pump and the second feeding pump. Liner material acceptance unit (10) is disposed which is selectively located at an operating position where the liner material acceptance unit accepts a liner material discharged from discharge unit (18), and a non-operating position where the liner material acceptance unit does not interfere with the liner material discharged from the discharge unit.

1 Claim, 1 Drawing Sheet

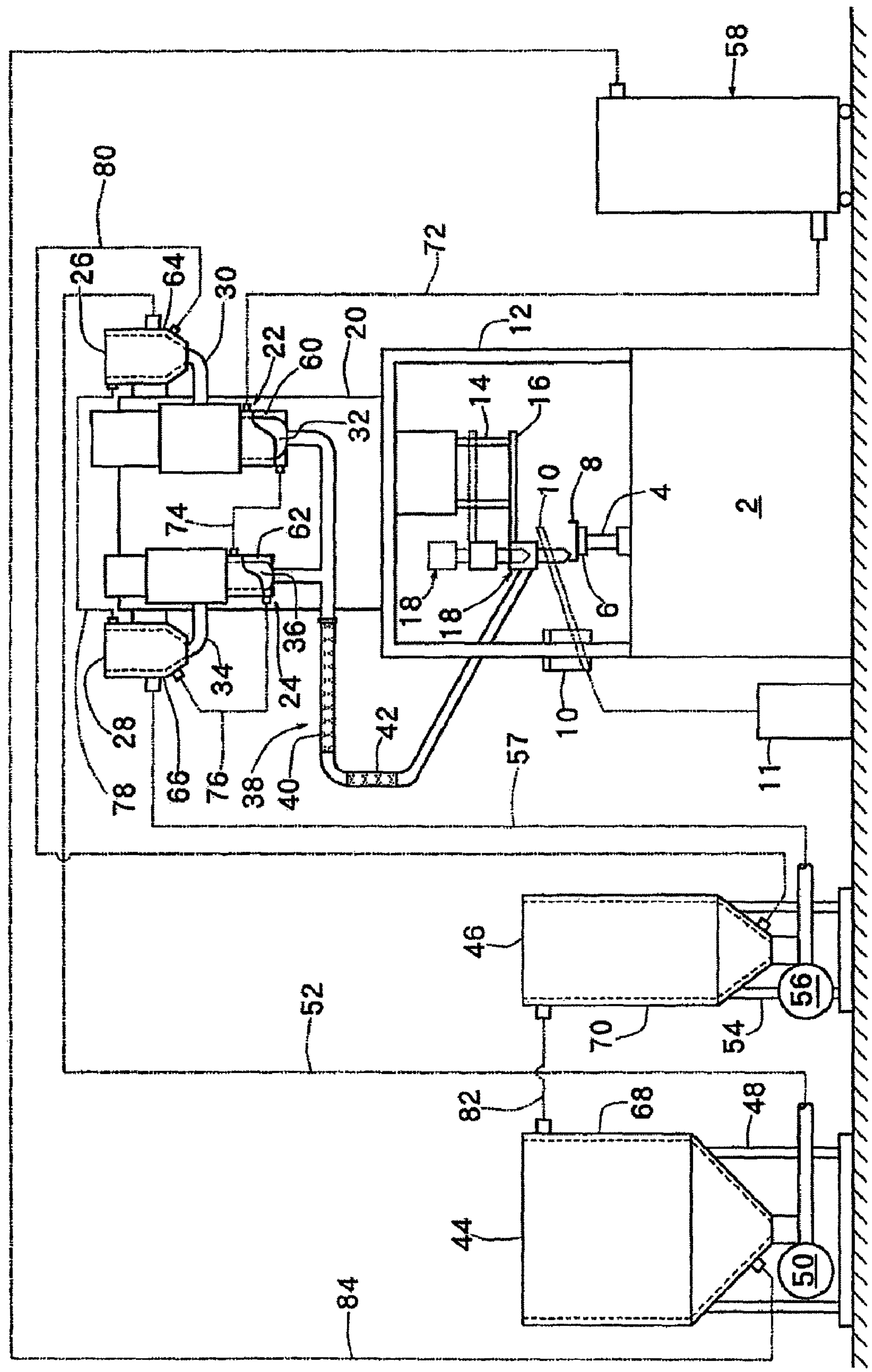

APPARATUS FOR MIXING LIQUIDS TO FORM A LINER MATERIAL

FIELD OF THE INVENTION

This invention relates to a liner material supply apparatus for mixing a first feedstock liquid and a second feedstock liquid, and supplying the mixture, as a liner material, to a container closure shell.

DESCRIPTION OF THE PRIOR ART

Japanese Patent Application Laid-Open No. 2003-145019 discloses a liner material supply apparatus for mixing a first feedstock liquid (for example, polyol as a main ingredient) and a second feedstock liquid (for example, polyisocyanate as a curing agent), and supplying the mixture, as a liner material, to a container closure shell. Such a liner material supply apparatus is composed of a first accommodation tank for accommodating the first feedstock liquid, a second accommodation tank for accommodating the second feedstock liquid, a mixing means for mixing the first feedstock liquid and the second feedstock liquid, a first feeding means for feeding the first feedstock liquid within the first accommodation tank into the mixing means, a second feeding means for feeding the second feedstock liquid within the second accommodation tank into the mixing means, and a discharge means for discharging the first feedstock liquid and the second feedstock liquid, mixed by the mixing means, as a liner material.

In the above-described liner material supply apparatus, it is important that the weight ratio between the first feedstock liquid to be fed to the mixing means by the first feeding means and the second feedstock liquid to be fed to the mixing means by the second feeding means be set sufficiently precisely, in order that a liner of a desired shape can be molded stably. Thus, the amount of the first feedstock liquid fed by the first feeding means and the amount of the second feedstock liquid fed by the second feeding means are both set at predetermined amounts sufficiently precisely. According to the inventors' experience, however, the following facts have been found: If the first feedstock liquid is polyol and the second feedstock liquid is polyisocyanate, the first feedstock liquid and the second feedstock liquid both vary in specific gravity relatively markedly according to temperature. Thus, even when the amount of the first feedstock liquid fed and the amount of the second feedstock liquid fed are set sufficiently precisely, the weight ratio between the first feedstock liquid and the second feedstock liquid varies considerably according to changes in the temperatures of the first feedstock liquid fed by the first feeding means and/or the second feedstock liquid fed by the second feeding means.

Furthermore, the conventional liner material supply apparatus described above poses the following problems to be solved: If a transient trouble occurs in the transport of the container closure shell to be supplied with the liner material, for example, it is necessary to stop the discharge of the liner material from the discharge means in the liner material supply apparatus. In the event of stoppage of the liner material discharge from the discharge means, the first feedstock liquid and the second feedstock liquid dwell, in an already mixed state, in the mixing means. As a result, a chemical reaction proceeds between the first feedstock liquid and the second feedstock liquid, which have been mixed, leading to progression of curing. In resuming the operation of the liner material supply apparatus, therefore, it becomes necessary to clean the mixing means which can be composed, for example, of a static mixer, or replace it by a new one.

SUMMARY OF THE INVENTION

A first object of the present invention is, therefore, to provide a novel and improved liner material supply apparatus by which the weight ratio between the first feedstock liquid and the second feedstock liquid to be fed to the mixing means is maintained sufficiently precisely.

A second object of the present invention is to provide a novel and improved liner material supply apparatus whose operation need not be stopped even if a primary trouble occurs, for example, in the transport of the container closure shell to be supplied with the liner material.

According to a first aspect of the present invention, the above first object is attained by annexing heating means, at least, to the first feeding means and the second feeding means, the heating means being adapted to bring the temperature of the first feedstock liquid, which is fed from the first accommodation tank to the mixing means through the first feeding means, and the temperature of the second feedstock liquid, which is fed from the second accommodation tank to the mixing means through the second feeding means, to predetermined temperatures.

That is, according to the first aspect of the present invention, as a liner material supply apparatus for attaining the aforementioned first object, there is provided a liner material supply apparatus for mixing a first feedstock liquid and a second feedstock liquid, and supplying the mixture, as a liner material, to a container closure shell, the liner material supply apparatus comprising a first accommodation tank for accommodating the first feedstock liquid, a second accommodation tank for accommodating the second feedstock liquid, a mixing means for mixing the first feedstock liquid and the second feedstock liquid, a first feeding means for feeding the first feedstock liquid within the first accommodation tank into the mixing means, a second feeding means for feeding the second feedstock liquid within the second accommodation tank into the mixing means, and a discharge means for discharging the first feedstock liquid and the second feedstock liquid mixed by the mixing means, and wherein heating means for bring the temperature of the first feedstock liquid, which is fed from the first accommodation tank to the mixing means through the first feeding means, and the temperature of the second feedstock liquid, which is fed from the second accommodation tank to the mixing means through the second feeding means, to predetermined temperatures are annexed, at least, to the first feeding means and the second feeding means.

Preferably, heating means for bringing the temperatures of the first feedstock liquid and the second feedstock liquid accommodated to predetermined temperatures are annexed to the first accommodation tank and the second accommodation tank as well. Further preferably, the liner material supply apparatus comprises a first master tank for accommodating the first feedstock liquid, a second master tank for accommodating the second feedstock liquid, a first supply means for supplying the first feedstock liquid accommodated in the first master tank into the first accommodation tank, and a second supply means for supplying the second feedstock liquid accommodated in the second master tank into the second accommodation tank, and heating means for bringing the temperatures of the first feedstock liquid and the second feedstock liquid accommodated to predetermined temperatures are annexed to the first master tank and the second master tank as well. It is advantageous that the heating means annexed to the first feeding means and the second feeding means are composed of heated liquid circulating passages which surround channels for flowing of the first feedstock liquid and the second feedstock liquid and in which a heated liquid is circulated; the heating means annexed to the first accommodation tank and the second accommodation tank are composed of heated liquid circulating passages which surround the first accommodation tank and the second accommodation tank and in which a heated liquid is circulated; and the heating means annexed to the first master tank and the second master tank are composed of heated liquid circulating passages which surround the first master tank and the second master tank and in which a heated liquid is circulated. The heated liquid may be hot water.

According to a second aspect of the present invention, moreover, the above second object is attained by disposing a liner material acceptance means which is selectively located at an operating position where the liner material acceptance means accepts the liner material discharged from the discharge means, and a non-operating position where the liner material acceptance means does not interfere with the liner material discharged from the discharge means.

That is, according to the second aspect of the present invention, as a liner material supply apparatus for attaining the aforementioned second object, there is provided a liner material supply apparatus for mixing a first feedstock liquid and a second feedstock liquid, and supplying the mixture, as a liner material, to a container closure shell, the liner material supply apparatus comprising a first accommodation tank for accommodating the first feedstock liquid, a second accommodation tank for accommodating the second feedstock liquid, a mixing means for mixing the first feedstock liquid and the second feedstock liquid, a first feeding means for feeding the first feedstock liquid within the first accommodation tank into the mixing means, a second feeding means for feeding the second feedstock liquid within the second accommodation tank into the mixing means, and a discharge means for discharging the first feedstock liquid and the second feedstock liquid mixed by the mixing means, and further comprising a liner material acceptance means which is selectively located at an operating position where the liner material acceptance means accepts the liner material discharged from the discharge means, and a non-operating position where the liner material acceptance means does not interfere with the liner material discharged from the discharge means.

In the liner material supply apparatus provided in accordance with the first aspect of the present invention, the temperature of the fist feedstock liquid to be fed to the mixing means by the first feeding means and the temperature of the second feedstock liquid to be fed to the mixing means by the second feeding means are both brought to predetermined temperatures. Thus, if the amount of the first feedstock liquid fed by the first feeding means and the amount of the second feedstock liquid fed by the second feeding means are controlled sufficiently precisely, the weight ratio between the first feedstock liquid and the second feedstock liquid to be fed to the mixing means can be maintained sufficiently precisely.

In the liner material supply apparatus provided in accordance with the second aspect of the present invention, if a primary trouble occurs in the transport of the container closure shell to be supplied with the liner material, the liner material acceptance means is located at the operating position to accept the liner material discharged from the discharge means into the liner material acceptance means. Thus, there is no need to stop the operation of the liner material supply apparatus.

BRIEF DESCRIPTION OF THE DRAWINGS

The FIGURE is a schematic view showing a preferred embodiment of the liner material supply apparatus constructed in accordance with the present invention.

DETAILED DESCRIPTION OF THE PREFERRED EMBODIMENTS

A preferred embodiment of the liner material supply apparatus constructed in accordance with the present invention will now be described in further detail with reference to the accompanying drawing.

The FIGURE shows a preferred embodiment of the liner material supply apparatus constructed in accordance with the present invention. The illustrated liner material supply apparatus includes a pedestal 2. A rotating shaft 4 extending substantially vertically is rotatably mounted on the pedestal 2, and a holding means 6, which may be a vacuum attraction chuck, is fixed to the upper end of the rotating shaft 4. A container closure shell 8 to be supplied with a liner material may be of a form having a circular top panel wall, and a skirt wall extending downwardly from the circumferential edge of the top panel wall. The container closure shell 8 is carried in onto the holding means 6 by a suitable carry-in means (not shown), with the container closure shell 8 lying in an inverted state, namely, the lower end of the skirt wall being directed upward. A rotational drive source (not shown) is coupled to the rotating shaft 4, whereby the rotating shaft 4 is rotated during supply of the liner material to the container closure shell 8, so that the container closure shell 8 held on the holding means 6 is rotated. The supply of the liner material to the container closure shell 8 will be further mentioned later. The container closure shell 8 supplied with the liner material is carried out from above the holding means 6 by a suitable carry-out means (not shown). A liner material acceptance means 10, which may be of an obliquely extending gutter shape, is disposed on the pedestal 2. The liner material acceptance means 10 is mounted to be movable between a non-operating position indicated by solid lines, and an operating position indicated by dashed double-dotted lines. When the liner material acceptance means 10 is located at the operating position indicated by the dashed double-dotted lines, the lower end of the liner material acceptance means 10 is connected to a recovery box 11 via a suitable chute member (not shown).

A support frame 12 is annexed to the pedestal 2, and a support member 16 is connected to the support frame 12 via an up-and-down moving means 14. A liner material discharge means 18 is mounted on a free end portion of the support member 16. The discharge means 18, which may itself be of a well known form, has a discharge hole at its lower end, and intermittently discharges the liner material through the discharge hole in response to the supply of the container closure shell 8 to the holding means 6. The up-and-down moving means 14 selectively brings the discharge means 18 to an operating position indicated by solid lines, namely, a descent position, and a retreat position indicated by dashed double-dotted lines, namely, an ascent position.

A support base plate 20 extending upwardly is coupled to the support frame 12, and a first accommodation tank 26 and a second accommodation tank 28, as well as a first feeding means 22 and a second feeding means 24, are mounted on the support base plate 20. The first feeding means 22 and the second feeding means 24 are each composed of a feed pump capable of controlling the amount of feed sufficiently precisely, for example, a mohno-pump marketed by HEISHIN Ltd. under the trade name "Heishin Robo Dispenser". The first accommodation tank 26 has a cylindrical main portion, and an inverted truncated conical tubular lower portion, and has a carry-out port formed at the lower end thereof. The carry-out port formed at the lower end of the first accommodation tank 26 is connected to a suction port of the first feeding means 22 by a communication pipe 30. When the first feeding means 22 is actuated, a liquid accommodated in the first accommodation tank 26, namely, a first feedstock liquid, is sucked into the first feeding means 22, and fed from the first feeding means 22 through a channel 32 formed in the first feeding means 22. Similarly, the second accommodation tank 28 has a cylindrical main portion, and an inverted truncated conical tubular lower portion, and has a carry-out port formed at the lower end thereof. The carry-out port formed at the lower end of the second accommodation tank 28 is connected to a suction port of the second feeding means 24 by a communication pipe 34. When the second feeding means 24 is actuated, a liquid accommodated in the second accommodation tank 28, namely, a second feedstock liquid, is sucked into the second feeding means 24, and fed from the second feeding means 24 through a channel 36 formed in the second feeding means 24.

The first feeding means 22 and the second feeding means 24 are connected to a carry-in port of the discharge means 18 via piping indicated entirely at a numeral 38. The piping 38 includes two static mixers 40 and 42. The static mixers 40 and 42 well known per se, which incorporate static mixing members in their flow passages, constitute a mixing means for mixing the first feedstock liquid and the second feedstock liquid.

With reference to the FIGURE, the illustrated liner material supply apparatus is also equipped with a first master tank 44 and a second master tank 46. The first master tank 44 supported by a support frame 48 has a cylindrical main portion, and an inverted truncated conical tubular lower portion. A first supply means 50, which can be composed of a gear pump, is annexed to a carry-out port formed at the lower end of the first master tank 44. The first supply means 50 is connected to a carry-in port of the first accommodation tank 26 via piping 52. The first feedstock liquid, for example, polyol as a main ingredient, is accommodated in the first master tank 44. In response to an increase or a decrease in the first feedstock liquid accommodated in the first accommodation tank 26, the operation of the first supply means 50 is controlled, with the result that the amount of the first feedstock liquid accommodated in the first accommodation tank 26 is maintained in a predetermined range. Similarly, the second master tank 46 supported by a support frame 54 has a cylindrical main portion, and an inverted truncated conical tubular lower portion. A second supply means 56, which can be composed of a gear pump, is annexed to a carry-out port formed at the lower end of the second master tank 46. The second supply means 56 is connected to a carry-in port of the second accommodation tank 28 via piping 57. The second feedstock liquid, for example, polyisocyanate as a curing agent, is accommodated in the second master tank 46. In response to an increase or a decrease in the second feedstock liquid accommodated in the second accommodation tank 28, the operation of the second supply means 56 is controlled, with the result that the amount of the second feedstock liquid accommodated in the second accommodation tank 28 is maintained in a predetermined range.

In the liner material supply apparatus constructed in accordance with the present invention, it is important, at least, that heating means be disposed which brings the temperature of the first feedstock liquid supplied from the first accommodation tank 26 to the mixing means (namely, static mixers 40 and 42) through the first feeding means 22, and the temperature of the second feedstock liquid supplied from the second accommodation tank 28 to the mixing means (namely, static mixers 40 and 42) through the second feeding means 24, to predetermined temperatures.

Further with reference to the FIGURE, in the illustrated embodiment, the heating means includes a heated liquid circulating means 58 for circulating a heated liquid which may be hot water. The heated liquid circulating means 58 incorporates a circulating pump (not shown) for circulating a heated liquid, and a heater (not shown), such as an electric resistance heater, for maintaining the heated liquid at a required temperature. In association with the heated liquid circulating means 58, a heated liquid circulating passage 60 surrounding the channel 32 of the first feeding means 22 is annexed to the first feeding means 22, and a heated liquid circulating passage 62 surrounding the channel 36 of the second feeding means 24 is annexed to the second feeding means 24. Also, a heated liquid circulating passage 64 surrounding the first accommodation tank 26 is annexed to the first accommodation tank 26, and a heated liquid circulating passage 66 surrounding the second accommodation tank 28 is annexed to the second accommodation tank 28. Moreover, a heated liquid circulating passage 68 surrounding the first master tank 44 is annexed to the first master tank 44, and a heated liquid circulating passage 70 surrounding the second master tank 46 is annexed to the second master tank 46. The heated liquid caused to flow out through an outflow port of the heated liquid circulating means 58 is fed to the heated liquid circulating passage 60 via piping 72, circulated in the heated liquid circulating passage 60, and then fed to the heated liquid circulating passage 62 via piping 74. After being circulated in the heated liquid circulating passage 62, the heated liquid is fed to the heated liquid circulating passage 66 via piping 76. After circulation in the heated liquid circulating passage 66, the heated liquid is fed to the heated liquid circulating passage 64 via piping 78. After circulation in the heated liquid circulating passage 64, the heated liquid is fed to the heated liquid circulating passage 70 via piping 80. After circulation in the heated liquid circulating passage 70, the heated liquid is fed to the heated liquid circulating passage 68 via piping 82. After circulation in the heated liquid circulating passage 68, the heated liquid is fed to an inflow port of the heated liquid circulating means 58 via piping 84, and returned to the heated liquid circulating means 58. The operation of the heater incorporated in the heated liquid circulating means 58 can be controlled, for example, based on the detection temperature of a temperature detector (not shown) for detecting the temperature of the first feedstock liquid flowing in the channel 32 and/or a temperature detector (not shown) for detecting the temperature of the second feedstock liquid flowing in the channel 36.

Furthermore, the heating means in the illustrated embodiment includes a heater (not shown), which may be an electric resistance heater, disposed on the outer peripheral surface of the piping 52 between the first master tank 44 and the first accommodation tank 26, and a heater (not shown), which may be an electric resistance heater, disposed on the outer peripheral surface of the piping 57 between the second master tank 46 and the second accommodation tank 28. The operation of these heaters can be controlled based on the detection temperatures of temperature detectors (not shown) for detecting the temperatures of the first feedstock liquid and the second feedstock liquid flowing in the pipings 52 and 57.

The actions and effects of the foregoing liner material supply apparatus described above are summarized as follows: The first feedstock liquid fed from the first accommodation tank 26 to the mixing means (static mixers 40 and 42) through the channel 32 of the first feeding means 22, and the second feedstock liquid fed from the second accommodation tank 28 to the mixing means (static mixers 40 and 42) through the channel 36 of the second feeding means 24 are mixed by the mixing means, and then supplied to the discharge means 18. The mixture is discharged, as a liner material, through the discharge hole of the discharge means 18, and supplied into the container closure shell 8 held on the holding means 6. The first feedstock liquid to be fed to the mixing means has its temperature maintained at a predetermined value sufficiently precisely by the heating means, and has its feed amount controlled sufficiently precisely by the first feeding means 22. Also, the second feedstock liquid to be fed to the mixing means has its temperature maintained at a predetermined value sufficiently precisely by the heating means, and has its feed amount controlled sufficiently precisely by the second feeding means 24. Thus, the weight ratio between the first feedstock liquid and the second feedstock liquid to be fed to the mixing means is maintained at a predetermined value sufficiently precisely.

If a primary trouble occurs in the transport of the container closure shell 8 onto the holding means 6, resulting in the failure to transport the container closure shell 8 onto the holding means 6, the discharge means 18 is raised to the retreat position indicated by the dashed double-dotted lines, and the liner material acceptance means 10 is brought to the operating position indicated by the dashed double-dotted lines. As a result, the liner material discharged from the discharge means 18 is discharged onto the liner material acceptance means 10, and recovered into the recovery box 11. Thus, it is not necessary to stop discharge from the discharge means 18, and a situation where the first feedstock liquid and the second feedstock liquid already mixed dwell in the piping 38 and cure can be reliably avoided.

While the preferred embodiment of the liner material supply apparatus constructed in accordance with the present invention has been described in detail by reference to the accompanying drawing, it is to be understood that the present invention is not limited to such an embodiment, but various changes and modifications may be made without departing from the scope of the invention.

What we claim is:

1. A liner material supply apparatus for mixing a first feedstock liquid and a second feedstock liquid, and supplying a mixture of these liquids, as a liner material, to a container closure shell, comprising:

a first accommodation tank for accommodating the first feedstock liquid;

a second accommodation tank for accommodating the second feedstock liquid;

mixing means for mixing the first feedstock liquid and the second feedstock liquid;

first feeding means for feeding the first feedstock liquid within the first accommodation tank into the mixing means;

second feeding means for feeding the second feedstock liquid within the second accommodation tank into the mixing means; and discharge means for discharging the first feedstock liquid and the second feedstock liquid mixed by the mixing means, and further comprising liner material acceptance means which is selectively located at an operating position where the liner material acceptance means accepts the liner material discharged from the discharge means, and a non-operating position where the liner material acceptance means does not interfere with the liner material discharged from the discharge means, wherein the discharge means is selectively positioned at an operation descent position and a retreat position, and the liner material acceptance means is located at the operation position when the discharge means is positioned at the retreat ascent position.

* * * * *